United States Patent
Im et al.

(10) Patent No.: US 11,926,441 B2
(45) Date of Patent: Mar. 12, 2024

(54) ORBIT TRANSITION APPARATUS

(71) Applicant: KOREA AEROSPACE RESEARCH INSTITUTE, Daejeon (KR)

(72) Inventors: Sung Hyuck Im, Daejeon (KR); Jun Seong Lee, Daejeon (KR); Kee Joo Lee, Daejeon (KR); Jae Sung Park, Daejeon (KR)

(73) Assignee: KOREA AEROSPACE RESEARCH INSTITUT, Daejeon (KR)

(*) Notice: Subject to any disclaimer, the term of this patent is extended or adjusted under 35 U.S.C. 154(b) by 0 days.

(21) Appl. No.: 17/555,848

(22) Filed: Dec. 20, 2021

(65) Prior Publication Data

US 2022/0332441 A1 Oct. 20, 2022

(30) Foreign Application Priority Data

Apr. 14, 2021 (KR) .................. 10-2021-0048467

(51) Int. Cl.
  *B64G 1/28* (2006.01)
  *B64G 1/00* (2006.01)
  *B64G 1/10* (2006.01)
  *B64G 1/24* (2006.01)

(52) U.S. Cl.
  CPC ............. *B64G 1/285* (2013.01); *B64G 1/002* (2013.01); *B64G 1/10* (2013.01); *B64G 1/242* (2013.01)

(58) Field of Classification Search
  None
  See application file for complete search history.

(56) References Cited

U.S. PATENT DOCUMENTS

| | | | | |
|---|---|---|---|---|
| 3,300,162 | A * | 1/1967 | Maynard | B64G 1/12 244/172.4 |
| 4,193,570 | A * | 3/1980 | Hoffman | B64G 1/38 244/165 |
| 4,723,735 | A * | 2/1988 | Eisenhaure | B64G 1/38 244/165 |
| 5,857,451 | A * | 1/1999 | Ciluffo | F41B 3/04 124/6 |
| 10,202,210 | B2 * | 2/2019 | Yaney | A63B 69/40 |
| 10,730,640 | B2 * | 8/2020 | Plisic | B64F 1/04 |
| 2006/0163434 | A1 * | 7/2006 | Patel | B64G 1/60 244/158.3 |
| 2008/0217482 | A1 * | 9/2008 | Ellinghaus | B64G 1/222 244/171.1 |
| 2009/0301454 | A1 * | 12/2009 | Tidman | F41B 3/04 473/607 |
| 2012/0076629 | A1 * | 3/2012 | Goff | B64G 1/646 414/730 |
| 2021/0206518 | A1 * | 7/2021 | Ehinger | B64G 1/283 |
| 2021/0387749 | A1 * | 12/2021 | Bloxton | B64G 1/12 |

FOREIGN PATENT DOCUMENTS

JP  2021049906 A  4/2021

* cited by examiner

*Primary Examiner* — Richard Green
*Assistant Examiner* — Nevena Aleksic
(74) *Attorney, Agent, or Firm* — von Briesen & Roper, s.c.

(57) ABSTRACT

An orbit transition apparatus that transitions an orbit of a payload in outer space includes a rotating body, an adapter disposed on a center part of the rotating body for docking a payload, a launch module disposed outside of the rotating body for launching the payload, and a thruster for rotating the rotating body. The launch module may launch the payload to a target orbit.

4 Claims, 2 Drawing Sheets

ORBIT TRANSITION APPARATUS

CROSS-REFERENCE TO RELATED APPLICATION

This application claims the benefit of Korean Patent Application No. 10-2021-0048467 filed on Apr. 14, 2021, in the Korean Intellectual Property Office, the entire disclosure of which is incorporated herein by reference for all purposes.

BACKGROUND

1. Field of the Invention

One or more of example embodiments relates to an orbit transition apparatus that transitions an orbit of a payload in outer space, and more particularly, an orbit transition apparatus that transitions an initial orbit of the payload to a target orbit in outer space using a rotating body based on a space flywheel principle.

2. Description of the Related Art

An artificial satellite refers to a satellite system designed and constructed by humans. An artificial satellite may be classified based on an exploration area (e.g., the Earth, planets, deep space, etc.) or be classified based on a space mission (e.g., communication, remote sensing, navigation, science and exploration, etc.). Although such categories are different in classification, they are the same in environment, a space environment, in which dangers including zero gravity, a vacuum, solar winds, and radioactive hazards may be present. Thus, an electrical and electronic system provided in the artificial satellite may need to recognize unique conditions in which the artificial satellite is operated as well as the limitations of such environment, while deriving the requirements of the system and reestablishing mission requirement conditions.

An artificial satellite mainly includes a payload and a bus. Here, the payload may be in the artificial satellite and may serve to perform an assigned mission, and the bus may assist an operation of the payload. That is, the payload in the artificial satellite may be directly related to a part of the artificial satellite and practically perform a mission defined in a mission statement including a mission objective, a mission performer, a mission operation concept, and the like.

When a rotating body operating in outer space is used, to which a flywheel principle is applied, a speed increment needed for the payload may be obtained to transition an orbit from an initial orbit to a target orbit.

Existing projectiles may use a propulsion system of the payload for landing the payload on a target track in a short period of time or for landing the payload on a parking track. An orbit transition may need a propulsion system, and the propulsion system that includes a propellant and an engine may need to be maintained until the payload reaches a target orbit. To overcome such inefficiency, there may be need for a launch method separate from the propulsion system rather than a self-propulsion method.

Disclosed in Japanese Patent Application Publication No. 2021-049906 is an orbit transition support device, an orbit transition support method, and an orbit transition support program.

The above description is information the inventor(s) acquired during the course of conceiving the present disclosure, or already possessed at the time, and is not necessarily art publicly known before the present application was filed.

SUMMARY

Example embodiments provide an orbit transition apparatus that transitions a payload from an initial orbit to a target orbit in outer space using a rotating body based on a space flywheel principle.

Example embodiments provide an orbit transition apparatus that transitions an orbit of a payload using only a rotational force of a rotating body maintaining a rotational motion with a propulsion system using electric energy or solar energy.

Example embodiments provide an orbit transition apparatus that operates as an infrastructure on a space orbit for landing a plurality of payloads in a target orbit multiple times.

Additional aspects of example embodiments are not limited to what is described in the foregoing, and other aspects that are not described above may also be learned by those skilled in the art from the following description.

According to an aspect, there is provided an orbit transition apparatus that transitions an orbit of a payload in outer space, the orbit transition apparatus including a rotating body, an adapter disposed on a center part of the rotating body for docking a payload, a launch module disposed outside of the rotating body for launching the payload, and a thruster for rotating the rotating body. The launch module may launch the payload to a target orbit.

The rotating body may include a flywheel center part disposed to be adjacent to the adapter, a ring-shaped flywheel peripheral part disposed outside of the flywheel center part, and a connecting part that connects the flywheel center part and the flywheel peripheral part and moves the payload positioned at the adapter to the launch module.

The rotating body may further include a balancing part moving on the connecting part and positioned symmetrically to the payload based on the flywheel center part.

The balancing part may be adjusted to be symmetrical to a position of the payload such that a rotational balance of the rotating body is maintained as the payload moves from the adapter to the launch module.

The adapter may be rotatable in a forward direction or a reverse direction about the flywheel center part for aligning the payload.

The launch module may include a launch guide that changes a launch direction of the payload.

The thruster may generate thrust through an electromagnetic wave and compensates for a reduced number of rotations of the rotating body based on a transfer of the payload.

The thruster may generate thrust through sunlight and adjusts a rotational speed of the rotating body.

The rotating body may further include a mass receiving part for collecting floating objects in space such that a moment of inertia of the rotating body increases.

Additional aspects of example embodiments will be set forth in part in the description which follows and, in part, will be apparent from the description, or may be learned by practice of the disclosure.

According to example embodiments, it is possible to transition a payload from an initial orbit to a target orbit in outer space using a rotating body based on a space flywheel principle.

According to example embodiments, it is possible to transition an orbit of a payload using only a rotational force of a rotating body maintaining a rotational motion with a propulsion system using electric energy or solar energy.

According to example embodiments, it is possible to land a plurality of payloads in a target orbit multiple times by operation of an infrastructure on a space orbit.

Additional effects of example embodiments are not limited to what is described in the foregoing, and other effects that are not described above may also be learned by those skilled in the art from the following description.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

Figure 1:
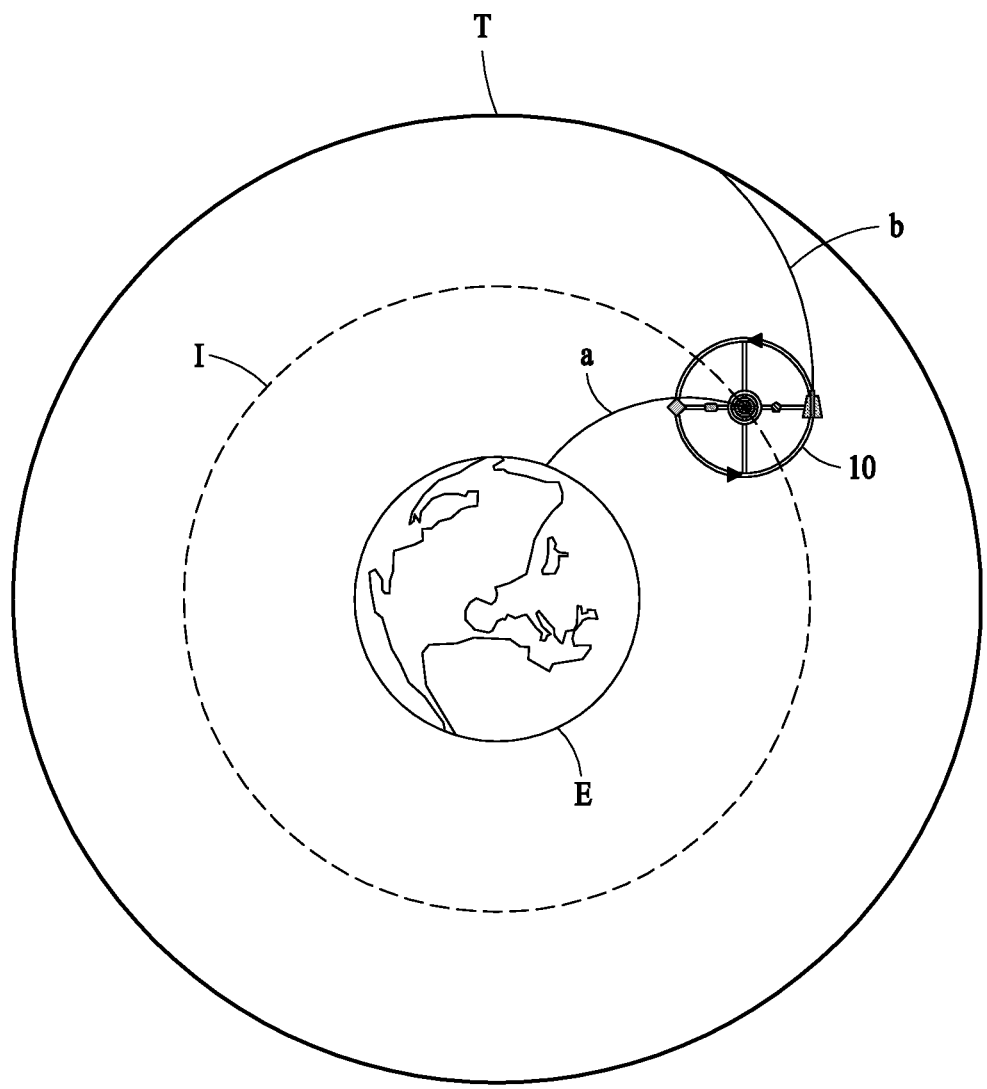
FIG. 1 is a diagram illustrating an overall example of an orbit transition apparatus operated in outer space according to an example embodiment.

The accompanying drawings illustrate preferred example embodiments of the present disclosure and are provided together with the detailed description for better understanding of the technical idea of the present disclosure. Therefore, the present disclosure should not be construed as being limited to the example embodiments set forth in the drawings.

DETAILED DESCRIPTION

Hereinafter, example embodiments will be described in detail with reference to the accompanying drawings. However, various modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein. the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, components or a combination thereof, but do not preclude the presence or addition of one or more other features, integers, steps, operations, elements, components and/or groups thereof.

Unless otherwise defined herein, all terms including technical and scientific terms used herein have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

When describing the example embodiments with reference to the accompanying drawings, like reference numerals refer to like constituent elements and a repeated description related thereto will be omitted. Also, in the description of example embodiments, detailed description of well-known related structures or functions will be omitted when it is deemed that such description will cause ambiguous interpretation of the present disclosure.

In addition, terms such as first, second, A, B, (a), (b) or the like may be used herein to describe components. Each of these terminologies is not used to define an essence, order, or sequence of a corresponding component but used merely to distinguish the corresponding component from other component(s). When it is mentioned that one component is "connected" or "accessed" to another component, it may be understood that the one component is directly connected or accessed to another component or that still other component is interposed between the two components.

The same name may be used to describe an element included in the example embodiments described above and an element having a common function. Unless otherwise defined herein, the descriptions of the example embodiments may be applicable to the following example embodiments and a repeated description related thereto will be omitted for conciseness.

Figure 2:
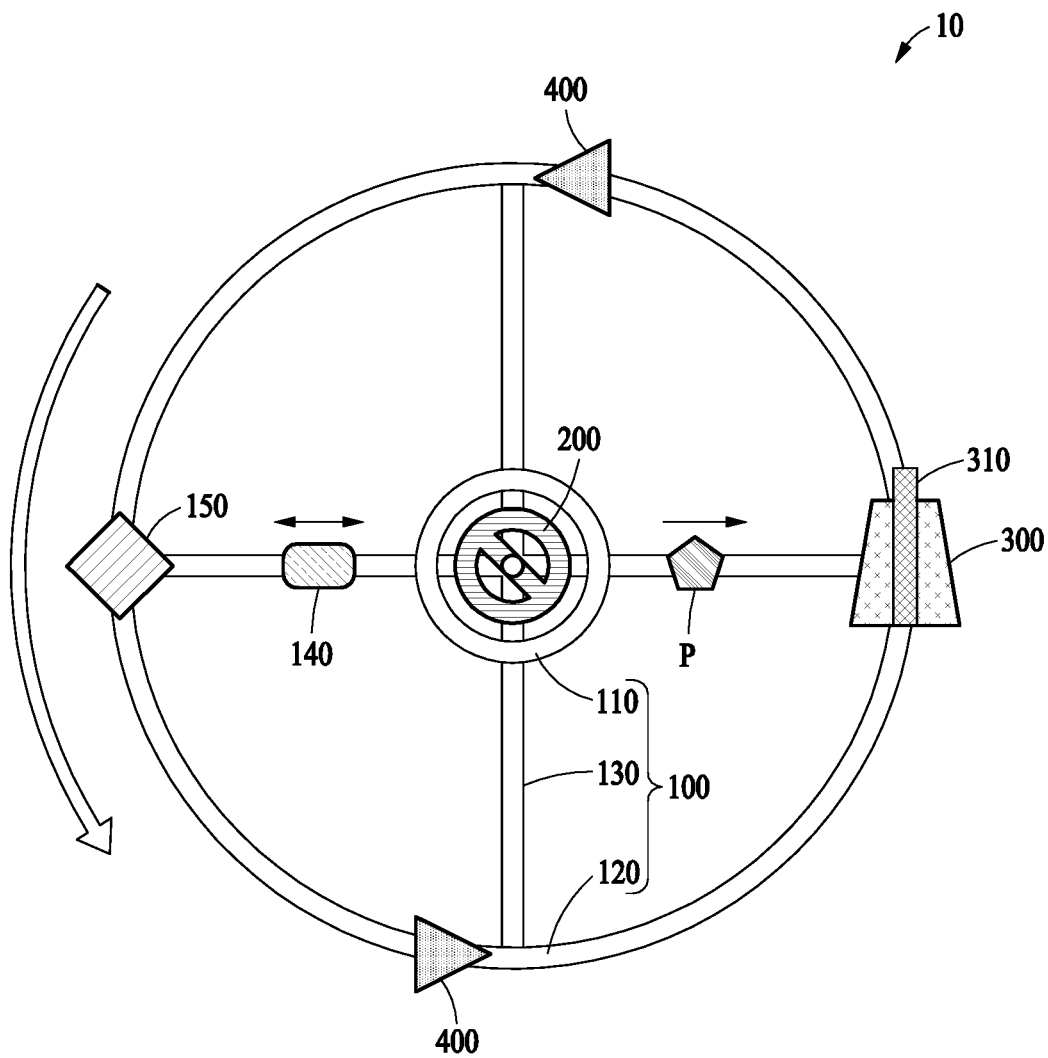
FIG. 2 is a diagram illustrating an example of an orbit transition apparatus according to an example embodiment.

FIG. 1 is a diagram illustrating an overall example of an orbit transition apparatus 10 operated in outer space according to an example embodiment, and FIG. 2 is a diagram illustrating an example of the orbit transition apparatus 10 according to an example embodiment.

Referring to FIGS. 1 and 2, the orbit transition apparatus 10 described herein that transitions an orbit of a payload P in outer space may include a rotating body 100, an adapter 200 disposed on a center part of the rotating body 100 for docking the payload P, a launch module 300 disposed outside of the rotating body 100 for launching the payload P, and a thruster 400 for rotating the rotating body 100.

The orbit transition apparatus 10 may move and stay in a predetermined orbit in outer space while orbiting the Earth E. Here, a self-rotation may also be performed at the same time as a revolution. That is, the orbit transition apparatus 10 may perform a mission of sending the payload P to a target orbit T using a rotational force of the orbit transition apparatus 10 after receiving the payload P launched from the Earth E while staying in an initial orbit I of the payload P. Instead of sending the payload P directly from the Earth E to the target orbit T by self-propulsion, it may be more energy efficient to send the payload P to the target orbit T using a continuous rotational force of an orbit transition apparatus E staying in outer space.

The rotating body 100 may include a flywheel center part 110 disposed to be adjacent to the adapter 200, a ring-shaped flywheel peripheral part 120 disposed outside of the flywheel center part 110, and a connecting part 130 that connects the flywheel center part 110 and the flywheel peripheral part 120 and moves the payload P positioned at the adapter 200 to the launch module 300. Since the flywheel center part 110 and the flywheel peripheral part 120 uses a flywheel principle, a ring shape or a disc shape may be desirable. However, both parts may be designed in other shapes based on the design. As the orbit transition apparatus 10 described herein needs to be constructed on an initial orbit I, thrust for reaching the initial orbit I from the Earth E may need to be reduced, which is why the flywheel center part 110 and the flywheel peripheral part 120 may have a ring-shaped design. The rotating body 100 may change a rotational speed and perform a continuous rotational motion. The connecting part 130 may be provided to connect the flywheel center part 110 and the flywheel peripheral part 120, and the connecting part 130 may be a guide for moving the payload P from the adapter 200 to the launch module 300. A driver such as an electric motor may be provided on the connecting part 130, and the payload P may be moved by such driver.

The adapter 200 may be rotatable in a forward direction or a reverse direction about the flywheel center part 110 for aligning the payload P launched from the Earth E. The adapter 200 may be able to rotate independently from the flywheel center 110 such that a relative speed with the payload P is controlled to be 0 for docking the payload P. For example, when the payload P is self-rotating, the adapter 200 may rotate independently in a forward direction or a reverse direction irrespective of the rotating body 100 or the flywheel center 110 to make a rotational direction and a rotational speed the same, and thus the adapter 200 may be aligned or be synchronized with the payload P.

The rotating body 100 may further include a balancing part 140 moving on the connecting part 130 and be positioned symmetrically with the payload P based on the flywheel center part 110. As the payload P moves from the adapter 200 to the launch module 300, the balancing part 140 may be positioned symmetrically to a position of the payload P such that a rotational balance of the rotating body 100 may be maintained. A mass of the payload P docked to the adapter 200 may be different, and thus a moving distance of the balancing part 140 may be different based on the mass of the payload P to maintain the rotational balance of the rotating body 100. The balancing part 140 may be manufactured with a self-detachable weight, and a mass of the balancing part 140 may be changed.

The launch module 300 may include a launch guide 310 that changes a launch direction of the payload P, and the launch module 300 may launch the payload P to the target orbit T. In addition, the launch module 300 may launch the payload P to the target orbit T or adjust a posture of the payload P. The payload P moved from the adapter 200 to the launch module 300 through the connecting part 130 may land on the launch guide 310, change its posture based on a posture adjustment of the launch module 300 connected to the launch guide 310, and be launched in a desirable launch direction toward the target orbit T. For example, both an inward and outward tangential direction may be adjusted, in addition to a tangential direction of the flywheel peripheral part 120.

The payload P launched from the Earth E may approach the orbit transition apparatus 10 along a launch orbit a and be docked to the adapter 200 of the orbit transition apparatus 10. The payload P may move towards the launch module 300 by the connecting part 130, be launched by the launch guide 310 in an adjusted launch direction, and an orbit transition b to the target orbit T may be performed.

The thruster 400 may compensate for a reduced number of rotations of the rotating body 100 based on a transfer (launch) of the payload P by generating thrust through electromagnetic waves. The thruster 400 may be disposed on the flywheel peripheral part 120 to increase a rotational force. In addition, the thruster 400 may generate thrust through sunlight to adjust a rotational speed of the rotating body 100, hold a propellant, and adjust the rotational speed of the rotating body 100 through the propellant.

The rotating body 100 may further include a mass receiving part 150 for collecting objects floating in space such that a moment of inertia of the rotating body 100 increases. Such objects floating in space may be space debris. After the space debris is collected and received by the mass receiving part 150, the moment of inertia may increase using the increased mass of the mass receiving part 150.

The orbit transition apparatus 10 may be one type of infrastructure system in outer space that allows posture correction and acceleration/deceleration in outer space and launches an arriving payload P to the target orbit T while maintaining a rotational state.

Thus, the orbit transition apparatus 10 described herein may transition the payload P from the initial orbit I to the target orbit T in outer space using the rotating body 100 based on the space flywheel principle.

The orbit transition apparatus 10 described herein may transition an orbit of the payload P using only a rotational force of the rotating body 100 maintaining a rotational motion with a propulsion system using electric energy or solar energy.

The orbit transition apparatus 10 described herein may operate as an infrastructure on a space orbit, and thus a plurality of payloads P may land on the target orbit T multiple times.

While this disclosure includes specific examples, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example are to be considered as being applicable to similar features or aspects in other example embodiments. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An orbit transition apparatus that orbits Earth at an initial orbit and that transitions a payload in outer space from the initial orbit to a target orbit around the Earth, the orbit transition apparatus comprising:
    a rotating body comprising:
        a flywheel center part,
        a ring-shaped flywheel peripheral part disposed outside of the flywheel center part,
        a connecting part that connects the flywheel center part and the flywheel peripheral part, and
        a balancing part on the connecting part and positioned symmetrically to the payload relative to the flywheel center part;
    an adapter disposed on the flywheel center part of the rotating body for docking the payload, wherein the adapter is rotatable independently from the flywheel center part in a forward direction and a reverse direction;
    a launch module disposed on the flywheel peripheral part of the rotating body for launching the payload; and
    a thruster disposed on the flywheel peripheral part for rotating the rotating body,
    wherein the payload is conveyed along, via a driver motor, the connecting part of the rotating body from the adapter to the launch module, and wherein the launch module launches the payload to the target orbit using only a rotational force of a rotating body.

2. The orbit transition apparatus of claim 1, wherein the rotating body further comprises:

the balancing part moving on the connecting part as the payload is conveyed along the connecting part and positioned symmetrically to the payload relative to the flywheel center part.

3. The orbit transition apparatus of claim 2, wherein the balancing part is adjusted to be symmetrical to a position of the payload such that a rotational balance of the rotating body is maintained as the payload moves from the adapter to the launch module.

4. The orbit transition apparatus of claim 1, wherein the adapter is rotatable in the forward direction or the reverse direction about the flywheel center part for aligning the rotational direction and a rotational speed of the adapter with the payload.

* * * * *